US011204610B2

(12) United States Patent
Sano et al.

(10) Patent No.: US 11,204,610 B2
(45) Date of Patent: *Dec. 21, 2021

(54) INFORMATION PROCESSING APPARATUS, VEHICLE, AND INFORMATION PROCESSING METHOD USING CORRELATION BETWEEN ATTRIBUTES

(71) Applicant: Kabushiki Kaisha Toshiba, Tokyo (JP)

(72) Inventors: Yuma Sano, Kawasaki (JP); Tomoki Watanabe, Inagi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 114 days.

This patent is subject to a terminal disclaimer.

(21) Appl. No.: 15/638,665

(22) Filed: Jun. 30, 2017

(65) Prior Publication Data
US 2017/0344021 A1    Nov. 30, 2017

Related U.S. Application Data

(63) Continuation-in-part of application No. 15/450,377, filed on Mar. 6, 2017.

(30) Foreign Application Priority Data

May 30, 2016  (JP) .............................. JP2016-107751
Mar. 22, 2017  (JP) ................................ 2017-056409

(51) Int. Cl.
*G06K 9/00* (2006.01)
*G05D 1/02* (2020.01)
(Continued)

(52) U.S. Cl.
CPC ......... *G05D 1/0251* (2013.01); *G05D 1/0088* (2013.01); *G05D 1/0253* (2013.01);
(Continued)

(58) Field of Classification Search
CPC .......... G06K 9/00624; G06K 9/00664; G06K 9/00671; G06K 9/00771; G06K 9/00791;
(Continued)

(56) References Cited

U.S. PATENT DOCUMENTS 7,054,467 B1 *   5/2006  Honda ................... G01S 3/784
                                                                382/104
7,142,150 B2 *  11/2006  Thackray ................. G01S 7/41
                                                                342/54
(Continued)

FOREIGN PATENT DOCUMENTS

DE    10 2014 208 664 A1    11/2015
JP         3931879 B2         6/2007
(Continued)

OTHER PUBLICATIONS

Alberto Elfes, "Using Occupancy Grids for Mobile Robot Perception and Navigation", IEEE, Computer vol. 22, Issue 6, Jun. 1989, pp. 46-57 (Year: 1989).*

(Continued)

*Primary Examiner* — Eric Rush
(74) *Attorney, Agent, or Firm* — Oblon, McClelland, Maier & Neustadt, L.L.P.

(57) ABSTRACT

According to an embodiment, an information processing apparatus includes a memory having computer executable components stored therein; and a processing circuit communicatively coupled to the memory. The processing circuit acquires a plurality of pieces of observation information of surroundings of a moving body, generates a plurality of pieces of attribute information of the surroundings of the moving body on the basis of the plurality of pieces of observation information, and sets a reliability of the attribute
(Continued)

information of the surroundings of the moving body on the basis of correlation of the plurality of pieces of attribute information.

20 Claims, 12 Drawing Sheets

(51) Int. Cl.
  *G05D 1/00* (2006.01)
  *G06K 9/62* (2006.01)
  *G06T 7/70* (2017.01)
(52) U.S. Cl.
  CPC ......... *G05D 1/0255* (2013.01); *G05D 1/0257* (2013.01); *G06K 9/00664* (2013.01); *G06K 9/00791* (2013.01); *G06K 9/00798* (2013.01); *G06K 9/00805* (2013.01); *G06K 9/6288* (2013.01); *G06K 9/6289* (2013.01); *G06K 9/6292* (2013.01); *G06K 9/6293* (2013.01); *G06T 7/70* (2017.01); *B60R 2300/301* (2013.01); *B60R 2300/302* (2013.01); *G06T 2207/30252* (2013.01); *G06T 2207/30261* (2013.01)
(58) Field of Classification Search
  CPC ........... G06K 9/00798; G06K 9/00805; G06K 9/00812; G06K 9/03; G06K 9/34; G06K 9/62; G06K 9/6201; G06K 9/6202; G06K 9/6212; G06K 9/6215; G06K 9/6288; G06K 9/6289; G06K 9/629; G06K 9/6292; G06K 9/6293; G06K 2009/6213; G06T 7/10; G06T 7/11; G06T 7/143; G06T 7/70; G06T 2207/20021; G06T 2207/20112; G06T 2207/30236; G06T 2207/30248; G06T 2207/30252; G06T 2207/30256; G06T 2207/30261; G06T 2207/30264; G05D 1/0088; G05D 1/021; G05D 1/0231; G05D 1/0246; G05D 1/0251; G05D 1/0253; G05D 1/0255; G05D 1/0257; B60R 2300/30; B60R 2300/301; B60R 2300/302; B60R 2300/307
  USPC ....... 382/100, 103, 104, 173, 180, 181, 224, 382/282, 291, 325; 340/933, 937; 348/113, 118, 135, 143, 148
  See application file for complete search history.

(56) References Cited

U.S. PATENT DOCUMENTS

| | | | | |
|---|---|---|---|---|
| 7,386,163 | B2* | 6/2008 | Sabe | G06K 9/00664 382/104 |
| 10,029,804 | B1* | 7/2018 | Chamberlain | G06T 7/194 |
| 10,210,435 | B2* | 2/2019 | Fukuman | G06K 9/00805 |
| 10,260,892 | B2* | 4/2019 | Ichikawa | G05D 1/0212 |
| 10,488,507 | B2* | 11/2019 | Adachi | G01S 13/931 |
| 2005/0125154 | A1 | 6/2005 | Kawasaki | |
| 2006/0293856 | A1* | 12/2006 | Foessel | B60W 30/09 701/301 |
| 2007/0286475 | A1* | 12/2007 | Sekiguchi | G06K 9/00369 382/154 |
| 2010/0066587 | A1* | 3/2010 | Yamauchi | G05D 1/0274 342/70 |
| 2010/0114490 | A1* | 5/2010 | Becker | B60W 30/16 701/301 |
| 2011/0178668 | A1* | 7/2011 | Tanaka | G05D 1/024 701/25 |
| 2012/0053755 | A1 | 3/2012 | Takagi | |
| 2012/0173018 | A1* | 7/2012 | Allen | G05D 1/0274 700/245 |
| 2013/0079990 | A1* | 3/2013 | Fritsch | G06K 9/00798 701/41 |
| 2013/0223686 | A1* | 8/2013 | Shimizu | G06K 9/00624 382/103 |
| 2013/0265424 | A1* | 10/2013 | Zhang | G06K 9/00798 348/148 |
| 2014/0025331 | A1* | 1/2014 | Ma | G01S 5/0252 702/141 |
| 2015/0344028 | A1* | 12/2015 | Gieseke | B60W 30/00 348/148 |
| 2016/0138930 | A1* | 5/2016 | Akiyama | H04W 4/029 701/465 |
| 2017/0116487 | A1 | 4/2017 | Yamazaki et al. | |
| 2017/0157769 | A1* | 6/2017 | Aghamohammadi | G05D 1/0217 |
| 2017/0197311 | A1* | 7/2017 | Garcia | G01S 15/931 |
| 2017/0344888 | A1 | 11/2017 | Sano et al. | |

FOREIGN PATENT DOCUMENTS

| | | |
|---|---|---|
| JP | 2007-310741 A | 11/2007 |
| JP | 2009-31884 A | 2/2009 |
| JP | 4819166 B2 | 11/2011 |
| JP | 5206752 B2 | 6/2013 |
| JP | 5678793 B2 | 3/2015 |
| JP | 5712900 B2 | 5/2015 |
| JP | 2016-38689 A | 3/2016 |
| JP | 2017-83919 A | 5/2017 |
| JP | 2017-215939 A | 12/2017 |

OTHER PUBLICATIONS

Viyaj Badrinarayanan et al., "SegNet: A Deep Convolutional Encoder-Decoder Architecture for Robust Semantic Pixel-Wise Labelling", CVPR2015, May 27, 2015, 10 pages.

Jonathan Long et al., "Fully Convolutional Networks for Semantic Segmentation", CVPR2015, 2015, 10 pages.

Alex Kendall et al., "Bayesian SegNet: Model Uncertainty in Deep Convolutional Encoder-Decoder Architectures for Scene Understanding", CVPR2015, Oct. 10, 2016, 11 pages.

Alberto Elfes, "Using Occupancy Grids for Mobile Robot Perception and Navigation", Electrical and Computer Engineering Department/ Robotics Institute at Carnegie Mellon University, 1989, pp. 46-56 (with cover page).

Henning Lategahn et al; Occupancy Grid Computation from Dense Stereo and Sparse Structure and Motion Points for Automotive Applications, 2010 IEEE Intelligent Vehicles Symposium; Jun. 21-24, 2010; pp. 819-824.

Dominik Nuss et al.; Consistent Environmental Modeling by use of Occupancy Grid Maps, Digital Road Maps, and Multi-Object Tracking, 2014 IEEE Intelligent Vehicles Symposium (IV); Jun. 8-11, 2014; pp. 1371-1377.

Daniel Arbuckle et al; Temporal Occupancy Grids: a Method for Classifying the Spatio-Temporal Properties of the Environment, Proceedings of the 2002 IEEE/RSJ Intl. Conference on Intelligent Robots and Systems; Oct. 2002; pp. 409-414.

Thien-Nghia Nguyen et al.; Stereo-Camera-Based Urban Environment Perception Using Occupancy Grid and Object Tracking, IEEE Transactions on Intelligent Transportation Systems, vol. 13, No. 1, Mar. 2012; pp. 154-165.

\* cited by examiner

INFORMATION PROCESSING APPARATUS, VEHICLE, AND INFORMATION PROCESSING METHOD USING CORRELATION BETWEEN ATTRIBUTES

CROSS-REFERENCE TO RELATED APPLICATIONS

This application is a continuation-in-part application of application Ser. No. 15/450,377 filed on Mar. 6, 2017, which claims the benefit of priority from Japanese Patent Application No. 2016-107751 filed on May 30, 2016. This application also claims the benefit of priority from Japanese Patent Application No. 2017-056409, filed on Mar. 22, 2017, which claims the internal priority from Japanese Patent Application No. 2016-107751; the entire contents of which are incorporated herein by reference.

FIELD

Embodiments described herein relate generally to an information processing apparatus, a vehicle, and an information processing method.

BACKGROUND

In relation to semantic segmentation technology to identify an attribute for each of a plurality of pixels included in an image obtained through imaging by a camera, a method to calculate a probability (reliability) of an identification result of the attribute is known.

For example, in a convolution neural network, a technology to generate a large number of attribute identification results from one input image by sampling and removing a unit at the time of a test, obtain an average value of the attribute identification results as an attribute, and output a dispersion value as the reliability of the attribute is known.

However, the above-described conventional technology has problems that an amount of processing is large because the attribute identification by removal (dropout) of a network unit is conducted a plurality of times for one input image, and obtainment of sufficient accuracy is difficult because the reliability is calculated using only one image.

DETAILED DESCRIPTION

According to an embodiment, an information processing apparatus includes a memory having computer executable components stored therein; and a processing circuit communicatively coupled to the memory. The processing circuit acquires a plurality of pieces of observation information of surroundings of a moving body, generates a plurality of pieces of attribute information of the surroundings of the moving body on the basis of the plurality of pieces of observation information, and sets a reliability of the attribute information of the surroundings of the moving body on the basis of correlation of the plurality of pieces of attribute information.

Hereinafter, an information processing apparatus, a vehicle, and an information processing method according to embodiments will be described with reference to the appended drawings.

First Embodiment

Figure 1:
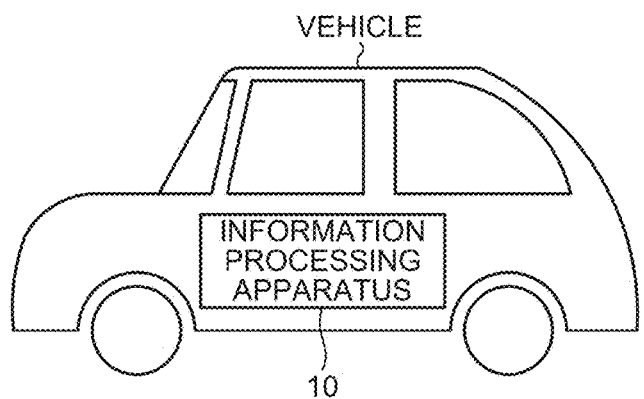
FIG. 1 is a diagram for describing an information processing apparatus of a first embodiment.

As illustrated in FIG. 1, an information processing apparatus 10 of the present embodiment is mounted on a vehicle. The information processing apparatus 10 is a dedicated or general-purpose computer, for example. Note that the information processing apparatus 10 may have a configuration in which processing by the information processing apparatus 10 is executed on a cloud, for example, without being mounted on the vehicle. Further, the type of a moving body on which the information processing apparatus is mounted is not limited to the vehicle and is arbitrary, and may be, for example, a robot or a drone. Note that the vehicle on which the information processing apparatus 10 is mounted may be a normal vehicle that travels through a drive operation by a person, or may be an automatic driving vehicle that can automatically travel (autonomously travel) without through the drive operation by a person. In the present embodiment, a case in which the vehicle on which the information processing apparatus 10 is mounted is the automatic driving vehicle will be exemplarily described.

Figure 2:
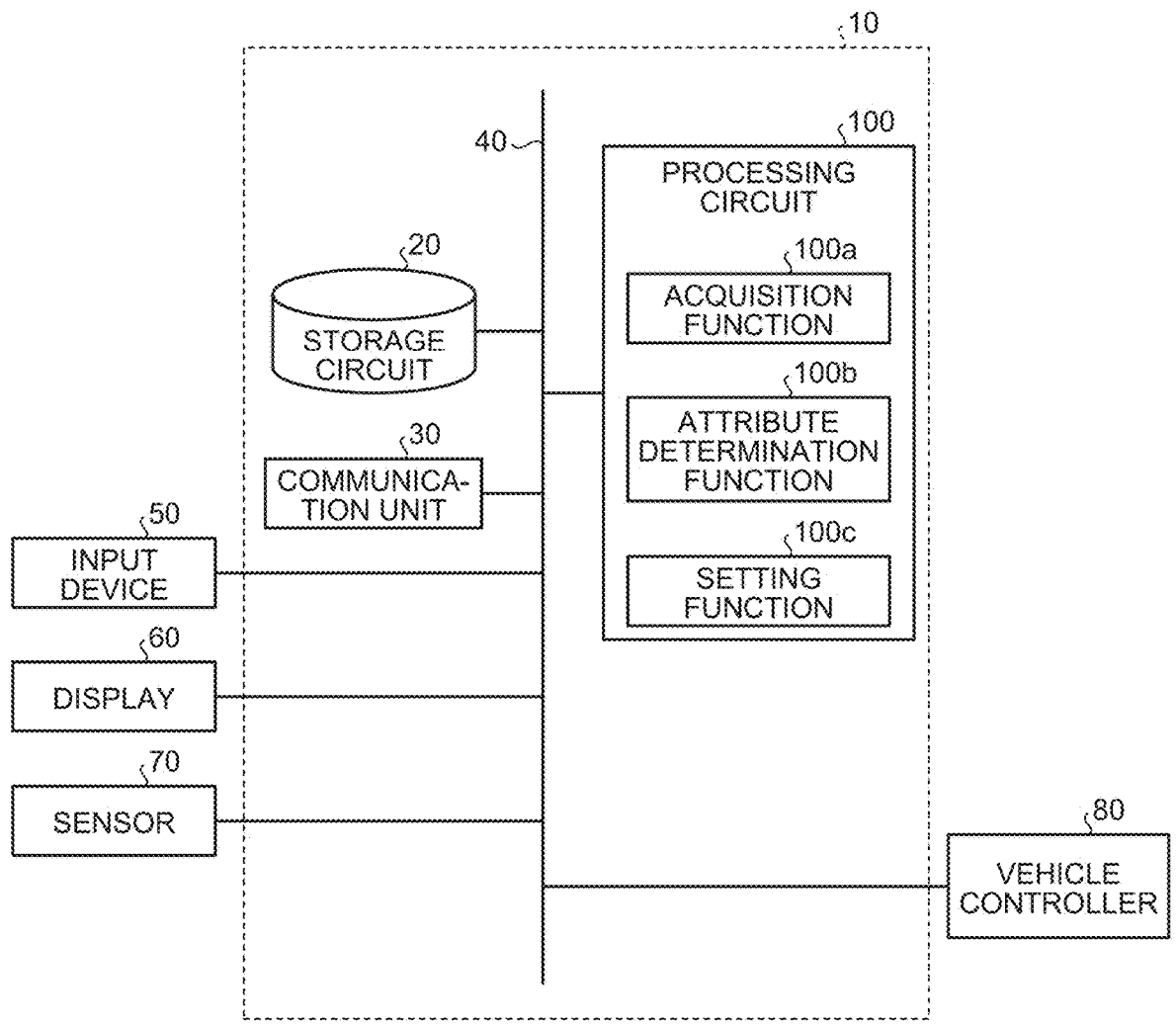
FIG. 2 is a diagram illustrating a configuration of the information processing apparatus of a first embodiment.

FIG. 2 is a diagram illustrating an example of a configuration of the information processing apparatus 10 of the present embodiment. As illustrated in FIG. 2, the information processing apparatus 10 includes a processing circuit 100, a storage circuit 20, a communication unit 30, and a bus 40 that connects the circuits and units.

The processing circuit 100 includes an acquisition function 100a, an attribute determination function 100b, and a setting function 100c. Specific content of these processing functions will be described below. Note that, in the example of FIG. 2, the functions in relation to the present embodiment are mainly exemplarily illustrated. However, functions included in the processing circuit 100 are not limited to the illustrated functions.

The processing functions performed in the information processing apparatus 10 are stored in the storage circuit 20 in a form of programs executable by the computer. The processing circuit 100 is a processor that realizes the functions corresponding to the programs by reading the programs from the storage circuit 20 and executing the programs. The processing circuit 100 that has read the programs has the functions illustrated in the processing circuit 100 of FIG. 2.

Note that, in FIG. 2, the description that the single processing circuit 100 realizes the processing functions performed in the acquisition function 100a, the attribute determination function 100b, and the setting function 100c has been given. However, the processing circuit 100 may be configured from a combination of a plurality of independent processors, and the processors may execute the programs to realize the functions. The processing functions may be configured from the programs, and one processing circuit may execute the programs, or a specific function may be mounted on a dedicated independent program executing circuit.

Note that the acquisition function 100a included in the processing circuit 100 may be referred to as an acquirer, the attribute determination function 100b may be referred to as an attribute determiner, and the setting function 100c may be referred to as a setter.

The wording "processor" used in the above description means, for example, a circuit of a central processing unit (CPU), a graphical processing unit (GPU), an application specific integrated circuit (ASIC), or a programmable logic device (for example, a simple programmable logic device (SPLD), a complex programmable logic device (CPLD), or a field programmable gate array (FPGA)). The processor realizes the functions by reading and executing the programs stored in the storage circuit 20. Note that the programs may be directly incorporated in the circuit of the processor, in place of being stored in the storage circuit 20. In this case, the processor realizes the functions by reading and executing the programs incorporated in the circuit.

The storage circuit 20 stores data and the like associated with the processing functions performed by the processing circuit 100, as needed. The storage circuit 20 of the present embodiment stores the programs and data used for various types of processing. For example, the storage circuit 20 is a random access memory (RAM), a semiconductor memory element such as flash memory, a hard disk, an optical disk, or the like. Further, the storage circuit 20 may be substituted with a storage device outside the information processing apparatus 10. The storage circuit 20 may be a storage medium to which the programs transmitted through a local area network (LAN) or the Internet are downloaded, and stored or temporarily stored. Further, the storage medium is not limited to one, and a case in which the processing in the above embodiment is executed from a plurality of media is also included in the storage medium in the embodiment, and the medium can have any configuration.

The communication unit 30 is an interface that performs an input/output of information to/from an external device connected by wired or wireless means. The communication unit 30 may be connected with and performs communication with the network.

An input device 50 receives various instructions and an input of information from an operator (a driver in this example). The input device 50 is, for example, a pointing device such as a mouse or a trackball, or an input device such as a keyboard.

A display 60 displays various types of information regarding the vehicle. The display 60 is, for example, a display device such as a liquid crystal display.

A sensor 70 is an external recognition sensor for realizing automatic driving. Examples of the sensor 70 include, but are not limited to, a sonar that searches for an object with a sound wave, a stereo camera for acquiring information in a depth direction of a vicinity of the vehicle, a position identifying camera for accurately identifying a place where the vehicle is traveling from surroundings, a millimeter wave radar or a laser sensor for measuring a distance to an object existing in the vicinity of the vehicle, and a position sensor that acquires a position of the vehicle. In the present embodiment, at least an imaging unit (camera) for imaging the surroundings of the own vehicle is mounted as the sensor 70.

A vehicle controller 80 determines a state of the vicinity on the basis of information obtained from the sensor 70 and an obstacle map obtained in processing described below, and controls an acceleration amount, a brake amount, a steering angle, and the like, in order to automatically drive the vehicle. To be specific, the vehicle controller 80 controls the vehicle to keep a lane on which the vehicle is currently traveling while avoiding an obstacle, and keep a distance from a vehicle in front by a predetermined distance or more.

The input device 50, the display 60, the sensor 70, and the vehicle controller 80 in the present embodiment are connected with the information processing apparatus 10 by wired or wireless means.

Next, the functions included in the processing circuit 100 will be described. The acquisition function 100a acquires a plurality of pieces of observation information of surroundings of a moving body (a vehicle in this example). Further, the acquisition function 100a acquires position information indicating an observation position. To be specific, the acquisition function 100a acquires a plurality of first sets, each of the first sets indicating a combination of the above-described observation information indicating a result of observation of the surroundings of the own vehicle, and the position information indicating the observation position. The observation information of the present embodiment is a captured image obtained through imaging by the imaging unit that images the surroundings of the vehicle. In this example, the imaging unit is attached to the vehicle, and thus the position information indicating the observation position (imaging position) corresponds to information (own position and posture information) indicating a position and a posture of the own vehicle. Note that the imaging refers to conversion of an image of a subject formed by an optical system such as a lens into an electrical signal.

The acquisition function 100a of the present embodiment acquires the set (first set) of the captured image obtained through the imaging and the position information (in this example, the own position and posture information of the vehicle) indicating the imaging position every time the imaging by the imaging unit is performed. That is, the acquisition function 100a acquires a plurality of the first sets in time series. However, an embodiment is not limited thereto, and for example, a plurality of the imaging units may be provided in different positions (for example, provided outside the vehicle), and a plurality of the first sets (sets of the captured image and the position information indicating the imaging position) corresponding on a one-to-one basis to the plurality of imaging units may be acquired at the same timing. In short, the acquisition function 100a may just acquire a plurality of the first sets by changing the condition of the observation, each of the first sets indicating the combination of the observation information (the captured image in this example) indicating a result of the observation of the surroundings of the own vehicle, and the position information indicating the observation position. The acquisition function 100a passes the captured images and the position information included in the acquired first sets to the attribute determination function 100b.

Figure 3:
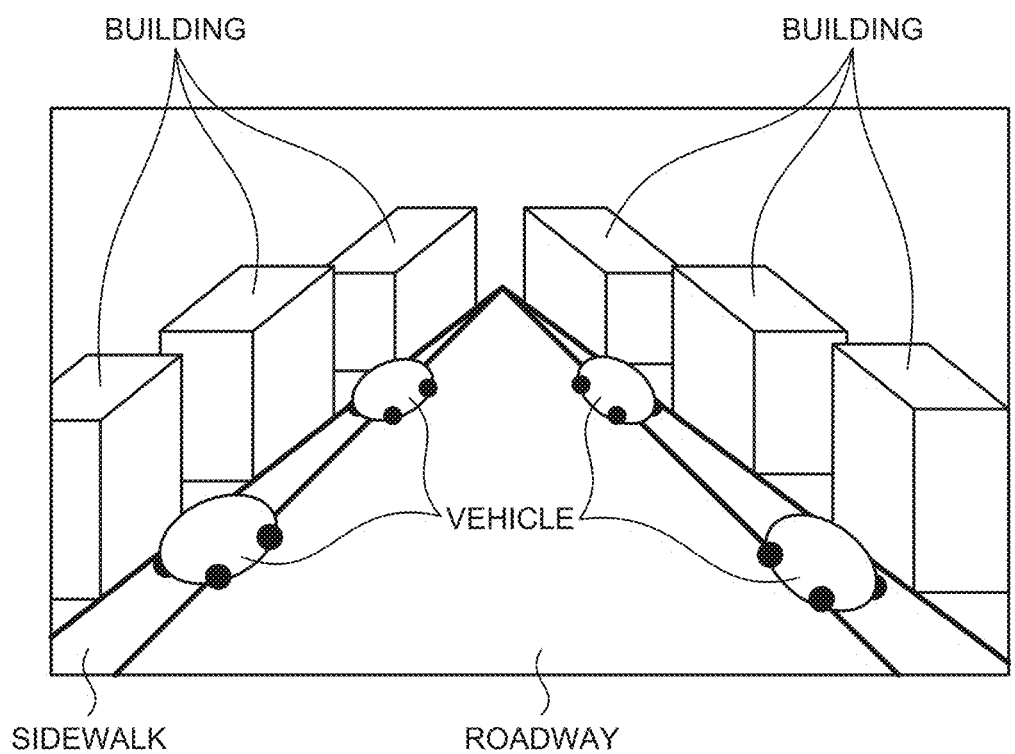
FIG. 3 is a diagram illustrating an example of a captured image of the first embodiment.

FIG. 3 is a diagram illustrating an example of the captured image. The captured image illustrated in FIG. 3 is a captured image obtained by imaging the front of the own vehicle. A roadway, sidewalks beside the roadway, parked vehicles (other vehicles), buildings, and the like are captured on the image. The acquisition function 100a of the present embodiment acquires the captured images of a range in relation to traveling of the own vehicle, like FIG. 3, in time series (the acquisition function 100a acquires a plurality of the captured images in time series) obtained through imaging by the imaging unit attached to the own vehicle.

As described above, in the present embodiment, the position information indicating the imaging position is the information (own position and posture information) indicating the position and the posture of the vehicle (own vehicle) to which the imaging unit is attached. Coordinate information indicating the position of the own vehicle can be acquired using a GPS mounted on the vehicle, and the posture information of the own vehicle can be similarly acquired using an inertial measurement unit (IMU) mounted on the vehicle. Note that the coordinate information indicating the position of the own vehicle is world coordinates based on a certain position.

Description of the functions included in the processing circuit 100 is continued. The attribute determination function 100b generates, for each of a plurality of areas obtained by dividing the surroundings of the vehicle, attribute information (attribute map) indicating an attribute of the area, on the basis of the observation information (the captured image in this example). To be specific, the attribute determination function 100b determines an attribute for each of a plurality of areas obtained by dividing the surroundings of the vehicle on the basis of the observation information (the captured image in this example) to generate the above-described attribute information, and generates second sets, each of the second sets indicating a combination of the generated attribute information and the position information. The "attribute" refer to information classified into a plurality of categories, and examples of the categories include, but are not limited to, a roadway, a sidewalk, a white line, a vehicle, a building, a pedestrian, and a traffic light. As the categories, statuses indicating availability of traveling such as travelable, untravelable, and unknown may be employed.

In this example, the attribute determination function 100b determines (identifies) the attribute in a pixel level, for an object captured in the image. This attribute determination (attribute identification) can be realized using machine learning. Many methods of the attribute identification of an image using machine learning are known. For example, the attribute can be determined (identified) in a pixel level, using a method such as J. Long, et. al, "Fully Convolutional Networks for Semantic Segmentation", CVPR 2015, or V. Badrinarayanan, et. al, "SegNet: A Deep Convolutional Encoder-Decoder Architecture for Robust Semantic Pixel-Wise Labelling", CVPR 2015. Please see the documents for details of the methods.

The attribute determination function 100b determines the attribute of each of pixels included in the captured image of FIG. 3, using the above-exemplarily described known method. Then, the attribute determination function 100b sets pixel values of the pixels to values indicating the determined attributes to generate the attribute information illustrated in FIG. 4.

Figure 5:
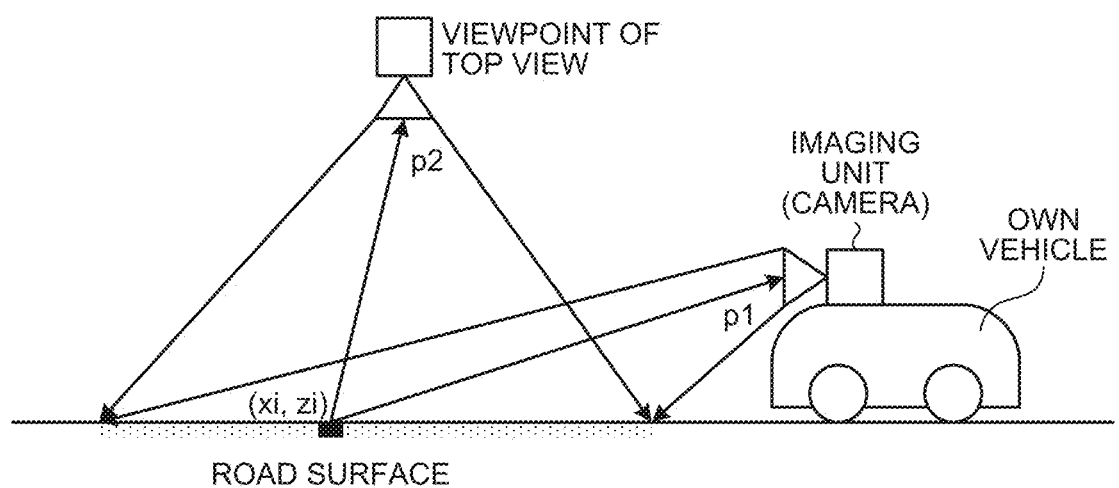
FIG. 5 is a diagram for describing an example of a method of generating the attribute information of the first embodiment.

Here, the attribute determination function 100b holds positional relationship information indicating positional relationship between the imaging unit and a road surface. The attribute determination function 100b projects the attribute information on the road surface on the basis of the positional relationship information, and then transforms an image projected on the road surface into an image (upper surface image) as viewed from above the road surface. The transformation of the image projected on the road surface into the upper surface image can be typically realized using a widely known method called inverse perspective mapping. An outline of the inverse perspective mapping will be described using FIG. 5. Here, a traveling direction is a z axis, a height direction is a y axis, and a direction perpendicular to the z axis and the y axis is an x axis. Coordinates of a square area divided from the road surface when the road surface is viewed from above are (xi, zi). Since the position and posture of the imaging unit with respect to the road surface are known, a pixel p1 corresponding to the coordinates (xi, zi) of the area, of the captured image, can be obtained by perspective projection transformation using the positional relationship information of the imaging unit and the road surface. Similarly, a pixel p2 corresponding to the coordinates (xi, zi) of the area, of the upper surface image, can be obtained by perspective projection transformation using the positional relationship information of a position specified as a viewpoint of the upper surface image (top view) and the road surface. A pixel value of the pixel p1 of the captured image is allocated as a pixel value of the pixel p2 of the upper surface image, whereby the pixel values of the pixels of the upper surface image can be set.

Figure 4:
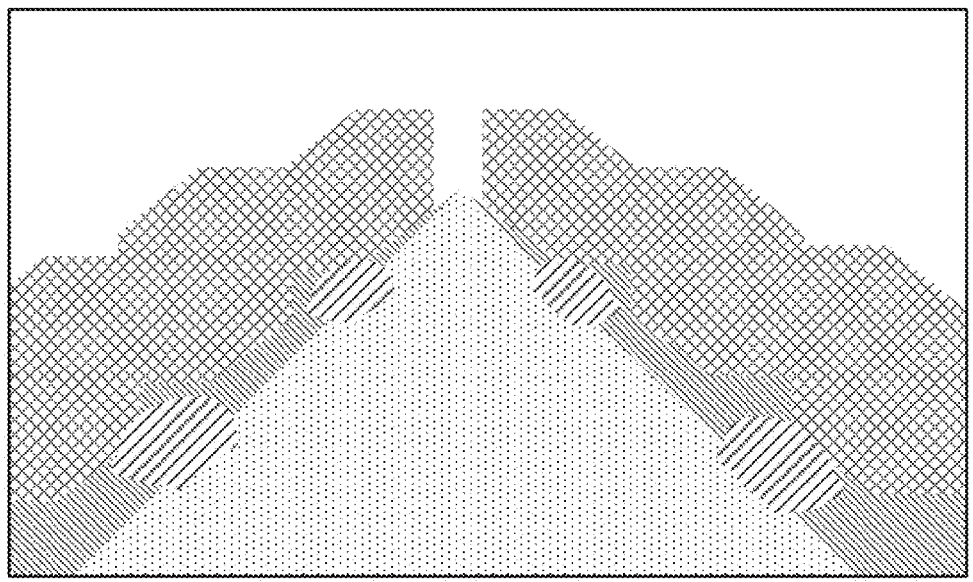
FIG. 4 is a diagram illustrating an example of attribute information of the first embodiment.
Figure 6:
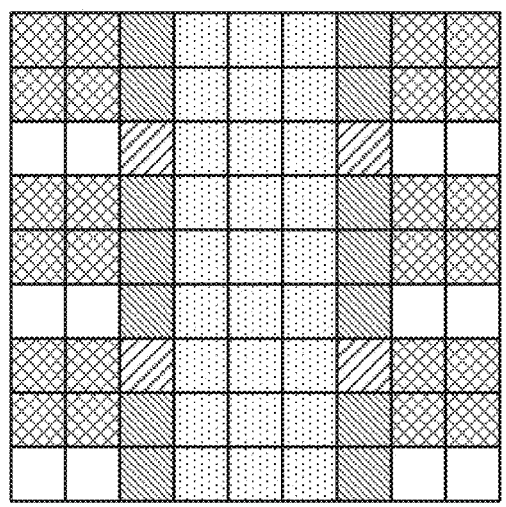
FIG. 6 is a diagram illustrating an example of the attribute information of the first embodiment.

FIG. 6 is a diagram illustrating the upper surface image transformed from the attribute information of FIG. 4. The attribute information generated from the captured image is transformed into the image (upper surface image) corresponding to a viewpoint of when the road surface is looked down from above. Here, the upper surface image (the size, the positions, the numbers, and the attributes of the square areas are identifiable) is sent to the setting function 100c as the attribute information.

The setting function 100c sets a reliability of the attribute information of the surroundings of the moving body on the basis of correlation of a plurality of pieces of the attribute information. Further, the setting function 100c sets a reliability in areas, from a plurality of pieces of the attribute information for the areas corresponding to the same position, on the basis of the position information. In the present embodiment, the setting function 100c sets a reliability of an attribute of an area of target attribute information, from correlation between the attribute of the area indicated by the target attribute information, and attributes of one or more corresponding areas indicating areas corresponding to the area of the target attribute information, in the other one or more pieces of the attribute information, using a plurality of pieces of the attribute information. In the present embodiment, the setting function 100c sets, on the basis of a plurality of the second sets, a reliability of an attribute of an area of a target second set, from correlation between the attribute of the area indicated by the attribute information included in the target second set, and attributes of corresponding areas in the other one or more pieces of the second sets. To be specific, the setting function 100c sets, using a plurality of the second sets, for each of a plurality of areas corresponding to a target second set, the reliability of the attribute of the area of the target second set, from correlation between the attribute of the area of the target second set, and the attribute of one or more corresponding areas indicating areas of a plurality of areas of each of the other one or more second sets, the areas corresponding to the area of the target second set. In the present embodiment, the setting function 100c sets, every time receiving the second set from the attribute determination function 100b, using the received second set (target second set) and N second sets received in the past, for each of a plurality of areas corresponding to the attribute information included in the target second set (the plurality of areas can be considered to be a plurality of areas obtained by dividing the surroundings of the own vehicle at the point of time when the target second set is acquired), the reliability of the attribute of the area of the target second set, from correlation between the attribute of the area of the target second set, and the attribute of one or more corresponding areas of a plurality of areas of each of N pieces of attribute information corresponding on a one-to-one basis to the N second sets received in the past, the one or more corresponding areas corresponding to the area of the target second set. Hereinafter, specific content will be described.

Figure 7:
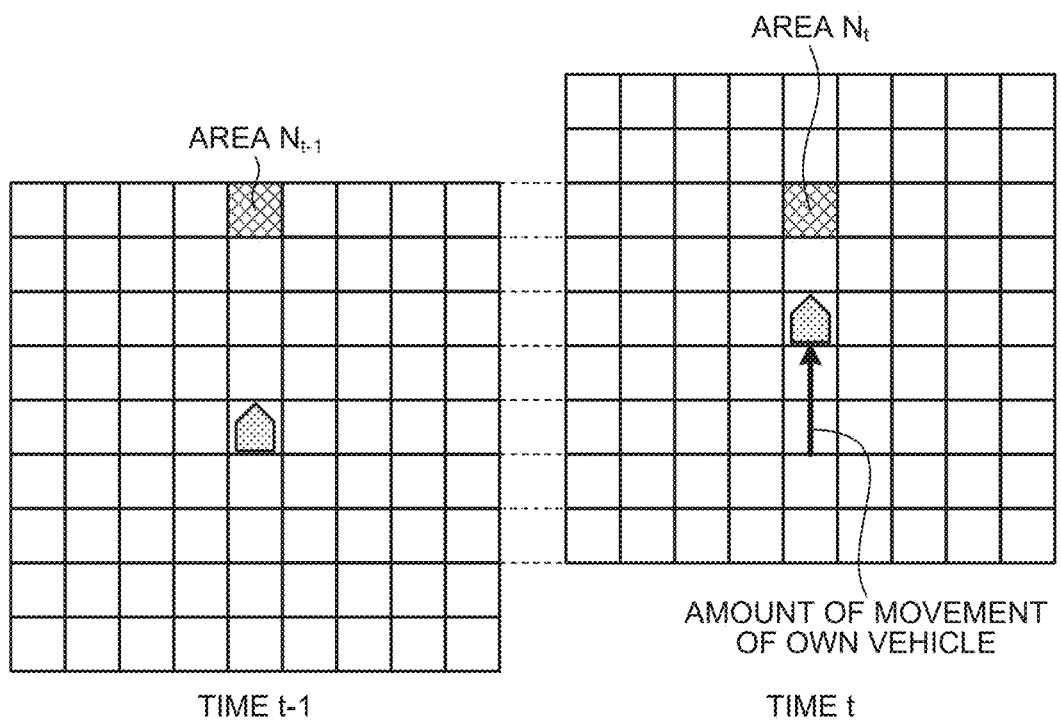
FIG. 7 is a diagram for describing a method of searching corresponding areas of the first embodiment.

The setting function 100c first, for each of areas of the attribute information included in the latest second set, searches for an area (corresponding area) corresponding to the area of the latest second set and identifies the attribute of the area (corresponding area), for each of N pieces of attribute information corresponding on a one-to-one basis to the past N second sets, using the position information (own position and posture information) corresponding to the attribute information, and the position information included in the latest second set. That is, the setting function 100c identifies the area corresponding to the same position of the area indicated by the target second set, as the corresponding area, of a plurality of areas of each of one or more second sets (the other one or more second sets) other than the target second set, on the basis of the position information. Details will be described using FIG. 7. FIG. 7 illustrates a plurality of areas obtained by dividing a space of the surroundings around the own vehicle at times t−1 and t. An area $N_{t-1}$ at the time t−1 and an area $N_t$ at the time t have different relative positions from the own vehicle at the respective times, but indicate the same position in the world coordinate system. The amount of movement of the own vehicle between the time t and its previous time t−1 is calculated from the position information, and areas at the time t−1 corresponding to the areas at the time t are obtained on the basis of the amount of movement of the own vehicle. In the example of FIG. 7, an area $N_{t-1}$ at the time t−1 corresponding to an area $N_t$ at the time t is obtained. For convenience of description, in the example of FIG. 7, the corresponding area in the attribute information included in one second set immediately before the latest second set has been acquired. However, an embodiment is not limited thereto, and corresponding areas can be obtained throughout a plurality of second sets (attribute information) acquired in the past, and its attributes can be obtained.

Next, a method of setting the reliability by the setting function 100c will be described. The setting function 100c of the present embodiment sets the reliability to a higher value as the correlation of a plurality of pieces of the attribute information is higher, and sets the reliability to a lower value as the correlation of the plurality of pieces of attribute information is lower. To be specific, the setting function 100c sets the reliability corresponding to the area to a higher value as the correlation between the attribute of the area indicated by the target second set and the attribute of the one or more corresponding areas is higher, and sets the reliability corresponding to the area to a lower value as the correlation between the attribute of the area indicated by the target second set and the attribute of the one or more corresponding areas is lower. To be specific, the setting function 100c sets the reliability corresponding to the area to a higher value as the number of the corresponding areas indicating the same attribute as the attribute of the area indicated by the target second set is larger, and sets the reliability corresponding to the area to a lower value as the number of the corresponding areas indicating the same attribute as the attribute of the area indicated by the target second set is smaller. Here, the setting function 100c sets, for each of the plurality of areas corresponding to the target second set, the reliability corresponding to the area to a higher value as the number of the corresponding areas indicating the same attribute as the attribute of the area is larger, and sets the reliability corresponding to the area to a lower value as the number of the corresponding areas indicating the same attribute as the attribute of the area is smaller.

Figure 8:
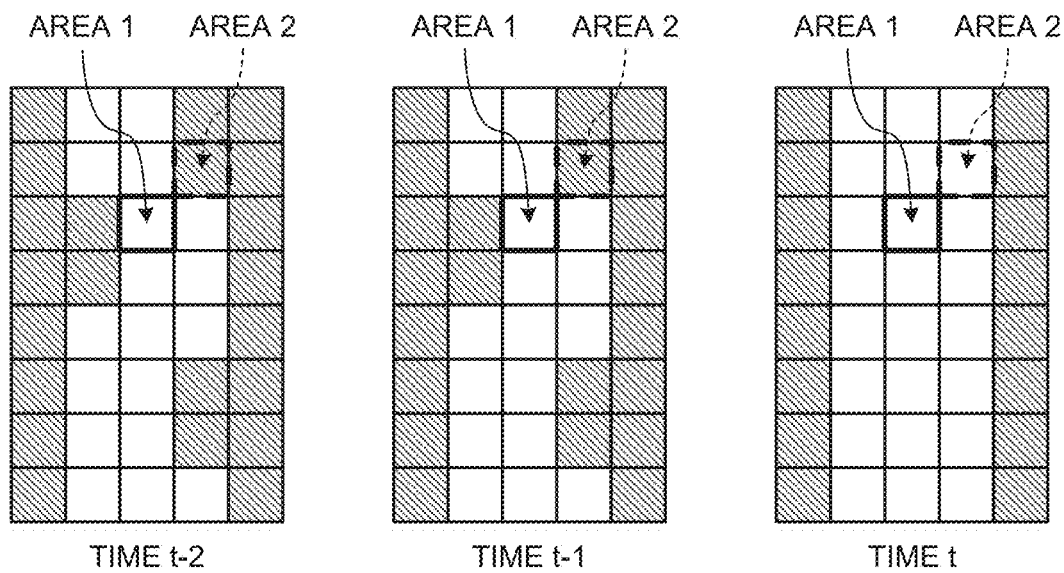
FIG. 8 is a diagram illustrating an example of corresponding areas of the first embodiment.

The method of calculating the reliability will be described in detail using FIG. 8. FIG. 8 is a diagram illustrating attributes of a plurality of areas obtained by dividing the surroundings of the own vehicle at the consecutive times t−2, t−1, and t. In FIG. 8, the areas displayed in "white" indicate areas where the attribute is identified as the roadway, and the areas displayed in a "shaded" manner indicate areas where the attribute is identified as other than the roadway. In the example of FIG. 8, the attribute of an area 1 is identified as the roadway at any of the times t−2, t−1, and t. Meanwhile, the attribute of an area 2 is identified as other than the roadway at the times t−2 and t−1, and is identified as the roadway at the time t. With regard to the attribute information for the captured image, while the areas existing inside the areas indicating the same attribute have a low difficulty in the attribute identification, and tend to take a correct attribute in time series, the areas existing near a boundary of the areas indicating different attributes have a high difficulty in the attribute identification and wrong identification is more likely to occur, and thus the attribute tends to be changed in time series. Therefore, with respect to the attributes of the areas of the current time (the time at which the latest second set is acquired), the reliability of the attributes of the areas at the current time is set higher as the number of times at which the attributes of areas corresponding to the same positions in the world coordinate system as the areas at the current time are the same is larger at times corresponding to the past N second sets (attribute information) determined in advance. Meanwhile, the reliability of the attributes of the areas at the current time is set lower as the number of times at which the attributes of areas corresponding to the same positions in the world coordinate system as the areas at the current time are the same is smaller at the times corresponding to the past N second sets determined in advance. For example, reliability $C_{L1}$ of an attribute L1 of a case where the attribute of a certain area at the current time is L1 can be calculated by Equation (1):

$$C_{L1} = \frac{N_{L1}}{N} \quad (1)$$

where the number of times at which the attribute of the corresponding areas is L1 at times corresponding to the past N second sets is $N_{L1}$.

As illustrated in FIG. 8, in a case where the areas have two types of attributes, an attribute value of 0 or 1 is provided, and average values of the past attribute values are held in the areas, so that the reliability can be calculated without holding all of the past N attribute information. In this case, reliability C(t) at the time t can be calculated by Equations (2):

$$L'(t) = \frac{L'(t-1) \times (N-1) + L(t)}{N} \quad (2)$$
$$C(t) = 1 - |L(t) - L'(t)|$$

where the attribute value at the time t is L(t), and the average value of the attribute values of the past N frames up to the time t−1 is L'(t−1).

Figure 9A:
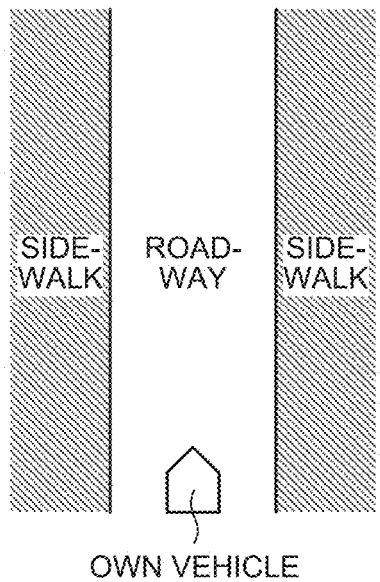
FIGS. 9A to 9D are diagrams for describing relationship between attributes and reliability of the areas of the first embodiment.
Figure 9B:
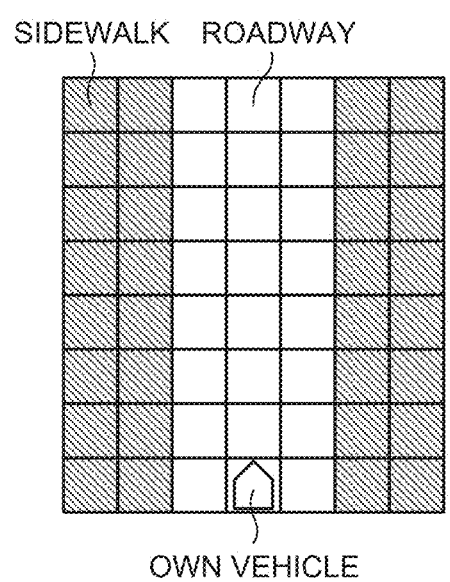
Figure 9C:
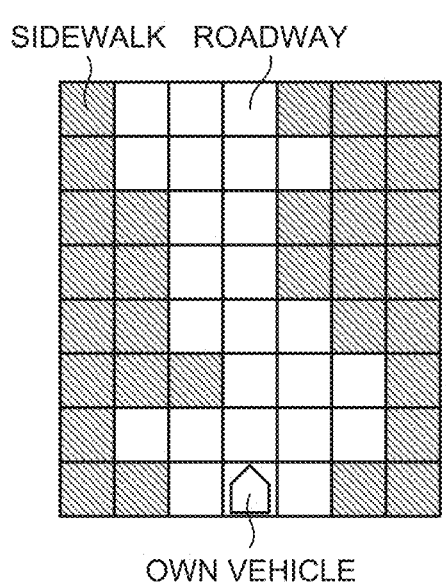
Figure 9D:
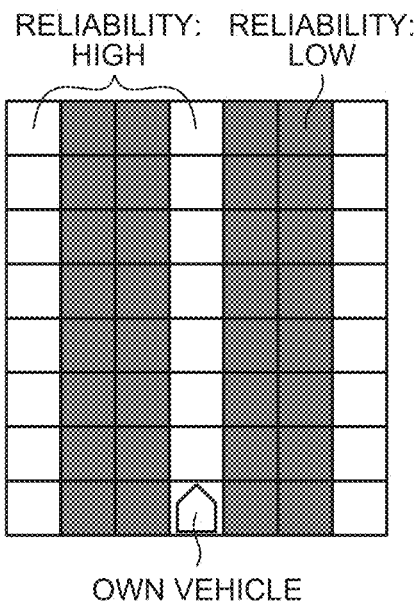

Next, relationship between the attribute and the reliability in the areas will be described using FIGS. 9A to 9D. In the scene illustrated in FIG. 9A, the attributes and the reliability of the areas of the surroundings of the own vehicle are obtained. The scene illustrated in FIG. 9A is a scene in which the roadway on which the own vehicle travels and the sidewalks on both sides of the roadway exist. FIG. 9B is a diagram illustrating a result teaching correct attributes for the scene illustrated in FIG. 9A. In the areas, the area corresponding to the roadway is illustrated by display corresponding to the attribute indicating the roadway (the area is displayed in "white" in FIGS. 9A and 9B), and the area corresponding to the sidewalk is illustrated by display corresponding to the attribute indicating the sidewalk (the area is displayed in a "shaded" manner in FIGS. 9A and 9B). In contrast, FIG. 9C is a diagram illustrating a result of identification of the attributes of the areas, using machine learning, by the attribute determination function 100b. Compared with FIG. 9B, wrong identification occurs in the areas positioned near the boundary of the roadway and the sidewalks. This tendency similarly occurs in an identification result of the attributes for the captured image obtained through imaging at different timing. FIG. 9D is a diagram illustrating the reliability set to each of the areas on the basis of the identification results. As described above, the setting function 100c of the present embodiment sets the reliability of the areas on the basis of time-series correlation of the attributes of the areas. Therefore, while the reliability is set to a high value in the vicinity of the center of the roadway and the sidewalks distant from the roadway where the identification results are stable in time series (these areas are displayed in "white" in FIG. 9D), the reliability is set to a low value in the areas near the boundary of the roadway and the sidewalks where the identification results are unstable in time series (these areas are displayed in "dark gray" in FIG. 9D). In the example of FIGS. 9A to 9D, a case in which two types of the attributes including the roadway and the sidewalk has been described. However, in a case of three or more attributes, the reliability can be similarly set on the basis of the time-series correlation of the attributes of the areas. As described above, the setting function 100c can set the reliability to each of the plurality of areas corresponding to the attribute information included in the target second set.

Note that, in the present embodiment, the reliability of the areas has been set on the basis of the time-series correlation of the attributes of the areas. However, for example, the above-described method (the method of setting the reliability) can be applied to a form in which the acquisition function 100a acquires a plurality of the first sets (sets of the captured image and the position information) at the same timing. In this case, the setting function 100c acquires a plurality of the second sets at the same timing. Therefore, any of the plurality of acquired second sets is employed as the target second set, and the reliability can be set to each of a plurality of the areas corresponding to the attribute information included in the target second set by the above-described method. As described above, calculation accuracy of the reliability of the areas can be improved by setting the reliability of each of the plurality of areas corresponding to the target second set, using the plurality of second sets having different observation conditions.

Figure 10:
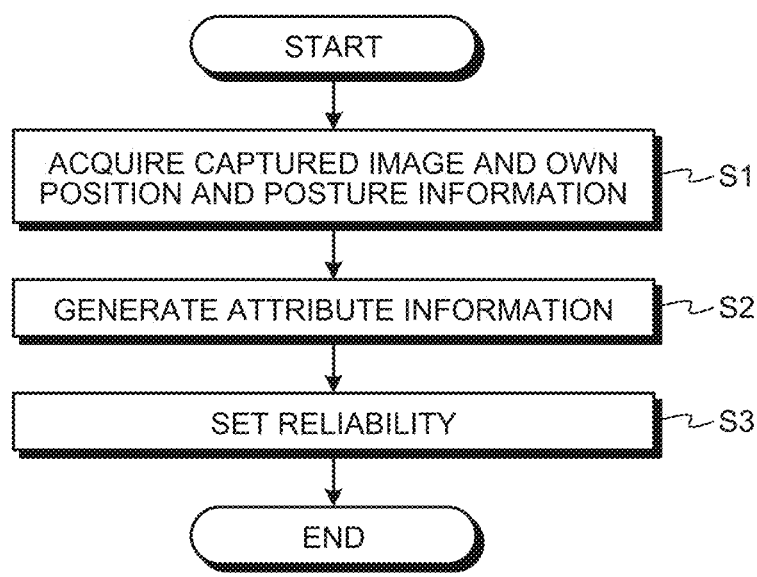
FIG. 10 is a diagram illustrating an operation example of the information processing apparatus of the first embodiment.

FIG. 10 is a flowchart illustrating an operation example of the information processing apparatus 10 (processing circuit 100) described above. Specific content of the steps has been described above, and thus detailed description is appropriately omitted. First, the acquisition function 100a acquires the captured image and the own position and posture information (the first set) (step S1). Next, the attribute determination function 100b determines the attribute for each of the plurality of areas obtained by dividing the surroundings of the own vehicle, on the basis of the captured image acquired in step S1, and generates the attribute information indicating the attributes of the plurality of areas (step S2). Next, the setting function 100c sets, for each of the plurality of areas corresponding to the attribute information generated in step S2, the reliability on the basis of the time-series correlation of the attribute of the area (step S3).

As described above, in the present embodiment, the reliability of the attribute of the area indicated by the target second set is set, from the correlation between the attribute of the area indicated by the target second set, and the attribute of one or more corresponding areas indicating areas of each of the other one or more second sets, the areas corresponding to the area indicated by the target second set, on the basis of the plurality of second sets. Accordingly, it is not necessary to repeat the processing for identifying the attribute a plurality of times, for one input image (captured image). In addition, the calculation accuracy of the reliability can be improved, compared with the method of calculating the reliability using only one input image. That is, according to the present embodiment, the reliability of the attributes of the areas of the surroundings of the own vehicle can be accurately calculated with a small amount of processing.

Second Embodiment

Next, a second embodiment will be described. Description of a portion common to that of the above-described first embodiment is appropriately omitted. In the present embodiment, observation information acquired by an acquisition function 100a is different from that of the first embodiment in that the observation information is information indicating a position of an object existing in surroundings of an own vehicle.

In this example, a distance sensor is attached to the own vehicle. The distance sensor radiates radio waves to surroundings of the own vehicle, and measures a distance from the own vehicle to the object by comparing a reflected wave from the object and a radiation wave. Then, the acquisition function 100a acquires a combination of position information of the object existing in the surroundings of the own vehicle, which has been measured by the distance sensor, and position information (own position and posture information of the vehicle in this case) indicating a measurement position, as a first set.

Here, a case in which the acquisition function 100a acquires position information (three-dimensional information) of the object existing in the surroundings of the own vehicle at different timing according to traveling of the own vehicle will be described. However, the position information of the object may be information measured by the distance sensor mounted on the vehicle or may be information acquired from an outside by communication means. Note that the position information of the object (dot) is acquired as information indicating a relative position based on a measurement position. Further, the acquisition function 100a acquires the position information of the distance sensor of when the position of the object is measured similarly to the above-described first embodiment. As described above, in the present embodiment, the position information of the object is measured using the distance sensor mounted on the vehicle. Therefore, similarly to the first embodiment, the acquisition function 100a acquires the own position and posture information, using a GPS or an IMU mounted on the vehicle. The acquisition function 100a acquires a plurality of the first sets in time series, and passes the position information (information indicating the position of the object existing in the surroundings of the own vehicle) and the own position and posture information (corresponding to information indicating the measured position) included in the acquired first set to an attribute determination function 100b, every time acquiring the first set.

The attribute determination function 100b determines an attribute for each of a plurality of areas obtained by dividing the surroundings of the own vehicle on the basis of the position information passed from the acquisition function 100a, and generates a second set indicating a combination of attribute information indicating the attribute of each of the plurality of areas, and the own position and posture information. The attributes here are information indicating availability of traveling of the own vehicle. The attribute determination function 100b determines that an obstacle exists in an area that includes a dot corresponding to the object that exists in a position closest to the own vehicle, and sets an attribute indicating untravelable, for each of a plurality of angle directions (angle directions from the own vehicle), for a space of the surroundings of the own vehicle. Further, in the angle directions, the attribute determination function 100b determines that no obstacle exists in an area closer to the own vehicle than the area that includes the dot existing in the position closest to the own vehicle, and sets an attribute indicating travelable. Further, in the angle directions, the attribute determination function 100b sets an attribute indicating unknown to an area more distant from the own vehicle than the area that includes the dot existing in the position closest to the own vehicle because the area is blocked by the obstacle.

Figure 11B:
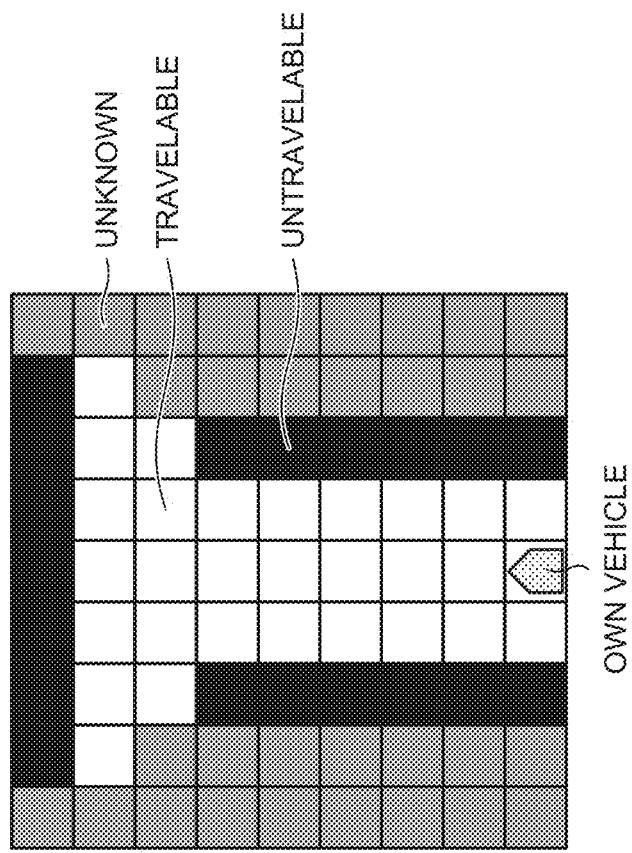
FIGS. 11A and 11B are diagrams illustrating an example of attribute information of a second embodiment.
Figure 11A:
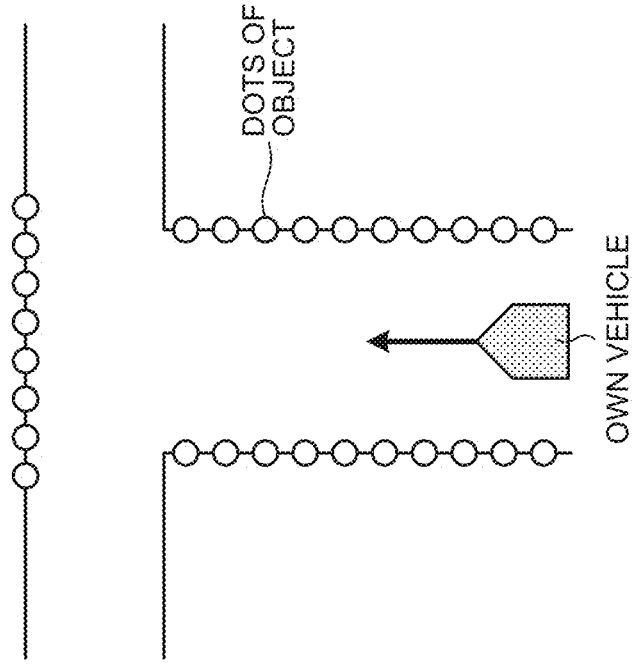

The plurality of areas obtained by dividing the surroundings of the own vehicle and the attributes set to the areas will be described using FIGS. 11A and 11B. FIG. 11A illustrates dots of objects (objects existing in the surroundings of the own vehicle) measured in a scene in which the own vehicle approaches a T-junction surrounded by fences. An example of a result (that is, the attribute information) obtained by determining the attribute for each of the plurality of areas obtained by dividing the surroundings of the own vehicle in the scene of FIG. 11A and setting the determined attributes is illustrated in FIG. 11B. As illustrated in FIG. 11B, the attribute indicating untravelable is set to areas that include the dots corresponding to the fences. The attribute indicating travelable is set to areas positioned between the own vehicle and the areas to which the attribute indicating untravelable is set. The attribute indicating unknown is set to areas blocked by the areas to which the attribute indicating untravelable is set. In the example of FIGS. 11A and 11B, the attributes are information classified into the three types of categories including travelable, untravelable, and unknown. However, the attributes may be information classified into two types of categories including travelable and untravelable, where unknown is regarded as untravelable.

As described above, the attribute determination function 100b generates the second set every time receiving the position information, and the own position and posture information from the acquisition function 100a, and sends the generated second set to a setting function 100c. The function of the setting function 100c is similar to that of the first embodiment and thus detailed description is omitted.

Third Embodiment

Next, a third embodiment will be described. Description of a portion common to that of the above-described embodiments is appropriately omitted.

Figure 12:
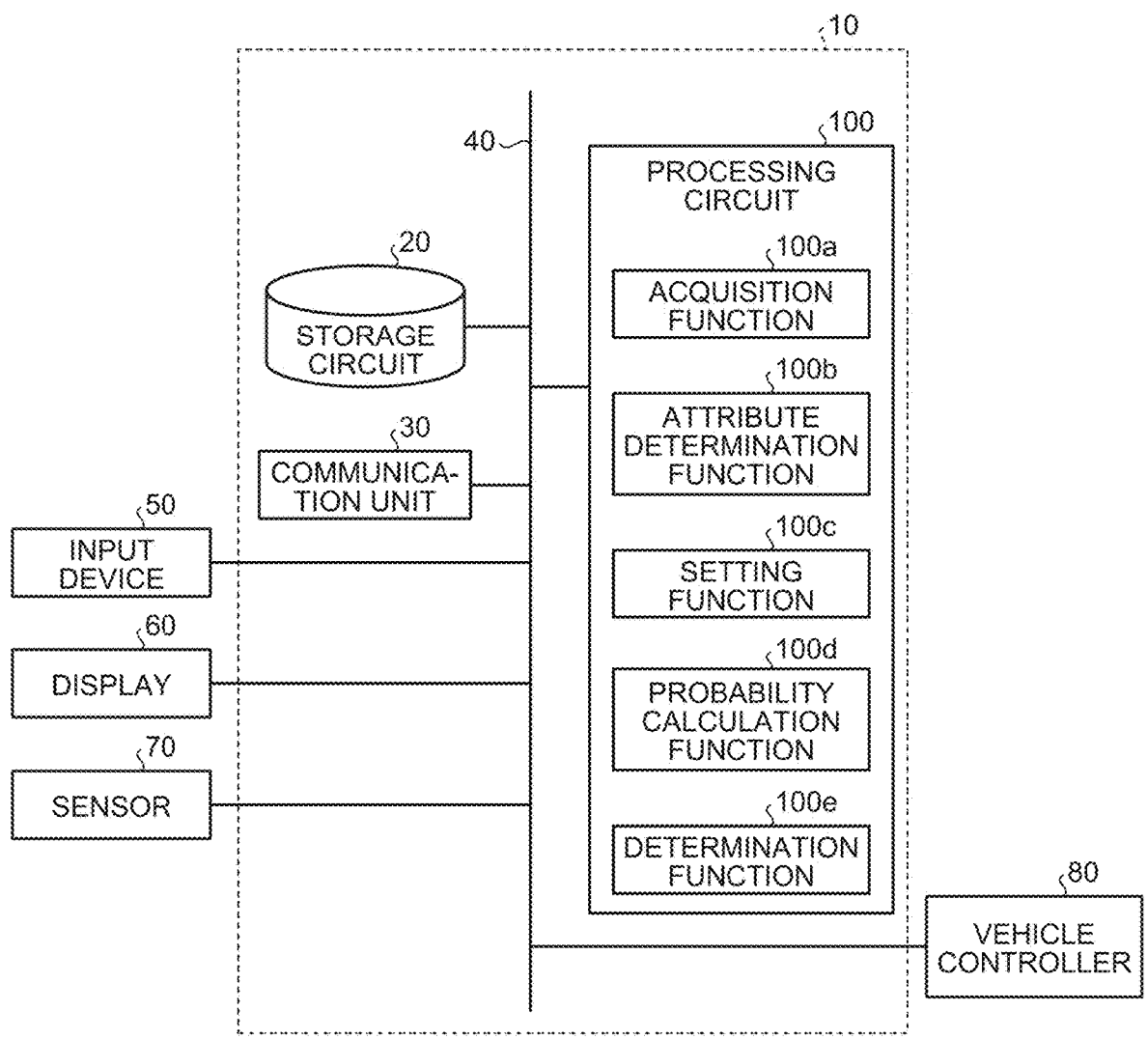
FIG. 12 is a diagram illustrating a configuration of an information processing apparatus of a third embodiment.

FIG. 12 is a diagram illustrating an example of a configuration of an information processing apparatus 10 of the present embodiment. As illustrated in FIG. 12, a processing circuit 100 further includes a probability calculation function 100d and a determination function 100e.

Further, in the present embodiment, a plurality of sensors for observing surroundings of an own vehicle is attached to the own vehicle. In this example, the imaging unit described in the first embodiment and the distance sensor described in the second embodiment are attached to the own vehicle. However, the sensors are not limited thereto. For example, two or more imaging units having different characteristics (parameters or the like) may be attached to the own vehicle, or two or more distance sensors having different characteristics may be attached to the own vehicle. Further, for example, two or more imaging units having the same characteristic or different characteristics may be provided in different positions outside the vehicle, or two or more distance sensors having the same characteristic or different characteristics may be provided in different positions outside the vehicle. Then, an acquisition function 100a acquires, for each of the plurality of sensors, a first set indicating a combination of observation information (for example, a captured image and position information of an object) and an observation position (for example, own position and posture information or the like). In short, the acquisition function 100a may just acquire a plurality of first sets for each of the plurality of sensors. In this example, the acquisition function 100a sends the observation information, and the own position and posture information included in the acquired first set to an attribute determination function 100b every time acquiring the first set of each of the plurality of sensors.

The attribute determination function 100b determines, for each of the plurality of sensors, an attribute for each of a plurality of areas obtained by dividing the surroundings of the own vehicle, on the basis of the observation information included in the first set corresponding to the sensor, generates a second set indicating a combination of attribute information indicating the attribute of each of the plurality of areas, and the own position and posture information, and sends the generated second set to a setting function 100c and a probability calculation function 100d. Note that, for example, the attribute determination function 100b may send only the attribute information to the probability calculation function 100d. Specific content of a method of generating the attribute information is as described in the above embodiments.

The setting function 100c sets, for each of the plurality of sensors, using the plurality of second sets (sets of the attribute information and the position information) corresponding to the sensor, for each of the plurality of areas corresponding to a target second set, reliability of the attribute of the area of the target second set, from correlation between the attribute of the area of the target second set, and the attributes of one or more corresponding areas. Specific content is as described in the above embodiments. That is, the setting function 100c generates, for each of the plurality of sensors, reliability information (a plurality of pieces of reliability information corresponding on a one-to-one basis to the plurality of sensors) indicating the reliability of the areas, and sends the generated reliability information to the determination function 100e.

The probability calculation function 100d calculates, for each of the plurality of areas obtained by dividing the surroundings of the own vehicle, a travelable probability indicating a probability that the own vehicle is travelable in the area, on the basis of the attribute information. In this example, the probability calculation function 100d calculates the travelable probability of the area on the basis of the attribute of the area, for each of the plurality of areas corresponding to the received attribute information, every time receiving the attribute information from the attribute determination function 100b. Here, while the travelable probabilities of the areas can be considered synonymous with probabilities (obstacle existing probabilities) that an object exists in the areas, the travelable probability becomes lower as the obstacle existing probability is higher. For example, relationship between the travelable probability and the obstacle existing probability can be expressed by Equation (3):

$$P_{free} = 1 - P_{obst} \quad (3)$$

where $p_{free}$ represents the travelable probability, and $p_{obst}$ represents the obstacle existing probability.

The probability calculation function 100d generates, for each of the plurality of sensors, the probability information indicating the travelable probabilities of the areas, and sends the generated probability information to the determination function 100e.

Figure 13:
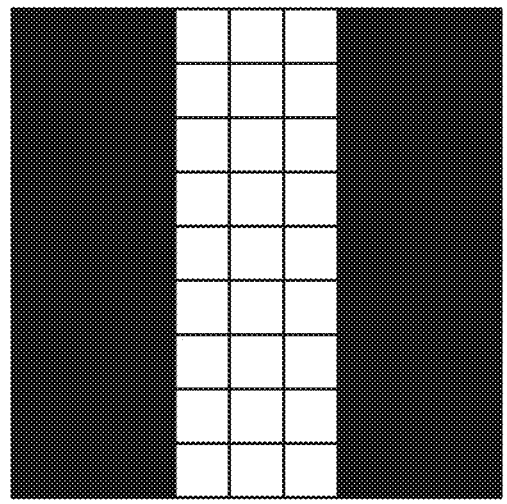
FIG. 13 is a diagram illustrating an example of probability information of the third embodiment.
Figure 14:
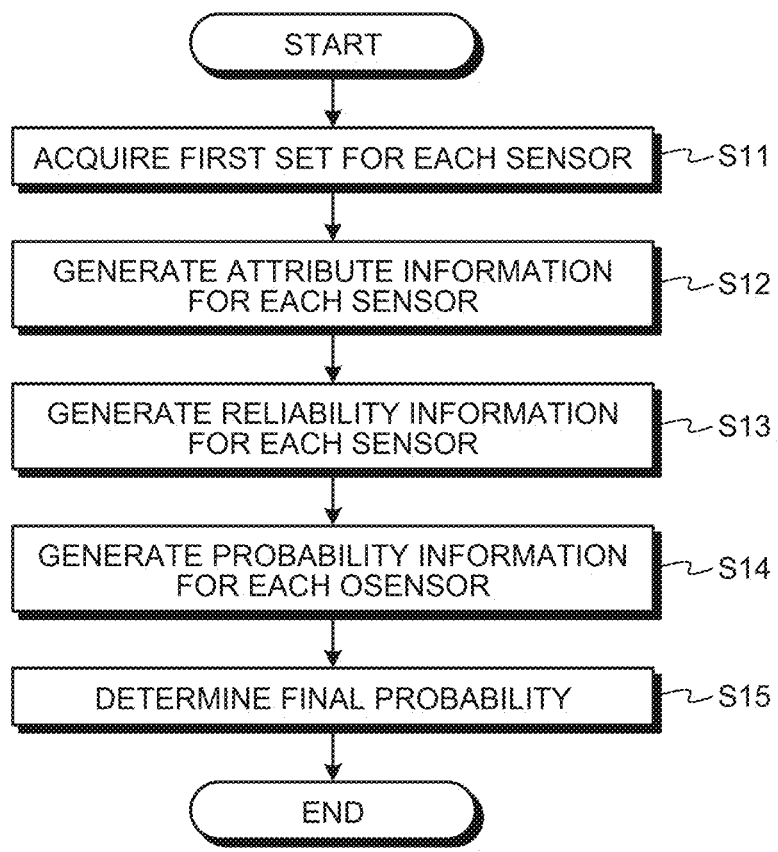
FIG. 14 is a diagram illustrating an operation example of the information processing apparatus of the third embodiment.

For example, as described in the first embodiment, assuming a case in which attributes indicating a roadway, a sidewalk, a white line, a vehicle, a building, a pedestrian, a traffic light, and the like are set to the areas as the attribute information. In this example, the probability calculation function 100d considers that an object (obstacle) does not exist only in areas where the attribute is identified (determined) as the roadway and the own vehicle is travelable, and sets the travelable probability to a maximum value (1.0). The probability calculation function 100d considers that the own vehicle is untravelable in areas where the attribute is identified as other than the roadway, and sets the travelable probability to a minimum value (0.0). Note that, as for the transformation from the attribute information to the travelable probability, values of the travelable probabilities may be set in multi-stages according to identification results, instead of two selections of the minimum value (0.0) and the maximum value (1.0). In short, the probability calculation function 100d can calculates the value of the travelable probability of the area where the attribute is the roadway to be higher than the value of the travelable probability of the area where the attribute is other than the roadway. FIG. 13 is a diagram illustrating an example in which the attribute information of FIG. 6 is transformed into the probability information. The travelable probabilities of the areas where the attribute is identified as the roadway in FIG. 6 are set to the maximum value (1.0) (the areas are displayed in "white" in FIG. 13), and the travelable probabilities of the areas where the attribute is identified as other than the roadway in FIG. 6 are set to the minimum value (0.0) (the areas are displayed in "black" in FIG. 13).

Further, for example, as described in the second embodiment, assuming a case in which the attributes indicating travelable, untravelable, and unknown are set to the areas as the attribute information. In this example, the probability calculation function 100d sets the travelable probabilities of areas in which the attribute is identified (determined) as travelable to the maximum value (1.0), sets the travelable probabilities of areas where the attribute is identified (determined) as unknown to an intermediate value (0.5), and sets the travelable probabilities of areas in which the attribute is identified (determined) as untravelable to the minimum value (0.0).

As described above, the probability calculation function 100d generates the probability information on the basis of the attribute information corresponding to the plurality of sensors. That is, the probability calculation function 100d generates the probability information for each of the plurality of sensors, and sends the generated probability information to the determination function 100e.

The determination function 100e acquires, for each of the plurality of sensors, the probability information and the reliability information described above, and determines final probabilities of the travelable probabilities of the plurality of areas obtained by dividing the surroundings of the own vehicle on the basis of the probability information and the reliability information of each of the plurality of sensors. Note that the numbers of the plurality of areas (the plurality of areas obtained by dividing the surroundings of the own vehicle) and sizes and positions of the areas corresponding to the probability information and the reliability information of the plurality of sensors correspond to one another (they may not be perfectly matched).

For example, the determination function 100e can determine, for each of the plurality of areas obtained by dividing the surroundings of the own vehicle, the travelable probability corresponding to the sensor having the highest reliability as the final probability. For example, in a case where the number of sensors is two, the final probability can be calculated by Equations (4):

$$P_{free} = p1_{free} (C1 > C2)$$

$$P_{free} = p2_{free} (C1 \leq C2) \quad (4)$$

In Equations (4), $p_{free}$ represents the final probability, $p1_{free}$ represents the travelable probability corresponding to one of the sensors (the one is referred to as "sensor 1"), $p2_{free}$ represents the travelable probability corresponding to the other sensor (referred to as "sensor 2"), c1 represents the reliability corresponding to the sensor 1, and c2 represents the reliability corresponding to the sensor 2.

Further, for example, the determination function 100e can determine, for each of the plurality of areas obtained by dividing the surroundings of the own vehicle, the final probability by performing weighted summing of the travelable probabilities of each of the plurality of sensors according to the reliability of each of the plurality of sensors. For example, in a case where the number of sensors is two, the final probability can be calculated by Equation (5):

$$P_{free} = p1_{free} \times w1 + p2_{free} \times w2 \quad (5)$$

In Equation (5), $p_{free}$ represents the final probability, $p1_{free}$ represents the travelable probability corresponding to one of the sensors (the one is referred to as "sensor 1"), $p2_{free}$ represents the travelable probability corresponding to the other sensor (referred to as "sensor 2"), w1 represents a weight of the sensor 1, and w2 represents the weight of the sensor 2. The weight w1 of the sensor 1 is expressed by c1/(c1+c2), and the weight w2 of the sensor 2 is expressed by c2/(c1+c2). c1 represents the reliability corresponding to the sensor 1, and c2 represents the reliability corresponding to the sensor 2.

As described above, the determination function 100e determines the final probability for each of the plurality of areas, thereby to obtain, for each of the plurality of areas, an obstacle map indicating the final probability of the area.

FIG. 13 is a flowchart illustrating an operation example of the information processing apparatus 10 (processing circuit 100) of the present embodiment. Detailed description is appropriately omitted as specific content of steps has been described. First, the acquisition function 100a acquires the first set (the combination of the observation information and the position information) for each of the plurality of sensors (step S11). Next, the attribute determination function 100b determines, for each of the plurality of sensors, the attribute for each of the plurality of areas obtained by dividing the surroundings of the own vehicle on the basis of the observation information corresponding to the sensor, and generates the attribute information indicating the attributes of the plurality of areas (step S12). Next, the setting function 100c sets, for each of the plurality of sensors, the reliability of the areas, using the latest second set indicating the combination of the position information included in the first set acquired in step S11 and the attribute information generated in step S12, and one or more past second sets, thereby to generate, for each of the plurality of sensors, the reliability information indicating the reliability of the areas (step S13). Next, the probability calculation function 100d calculates, for each of the plurality of sensors, the travelable probabilities of the areas on the basis of the attribute information corresponding to the sensor, thereby to generate, for each of the plurality of sensors, the probability information indicating the travelable probabilities of the areas (step S14). Next, the determination function 100e determines, for each of the plurality of sensors, the final probabilities of the travelable probabilities of the areas on the basis of the probability information and the reliability information corresponding to the sensor (step S15).

Fourth Embodiment

Figure 15:
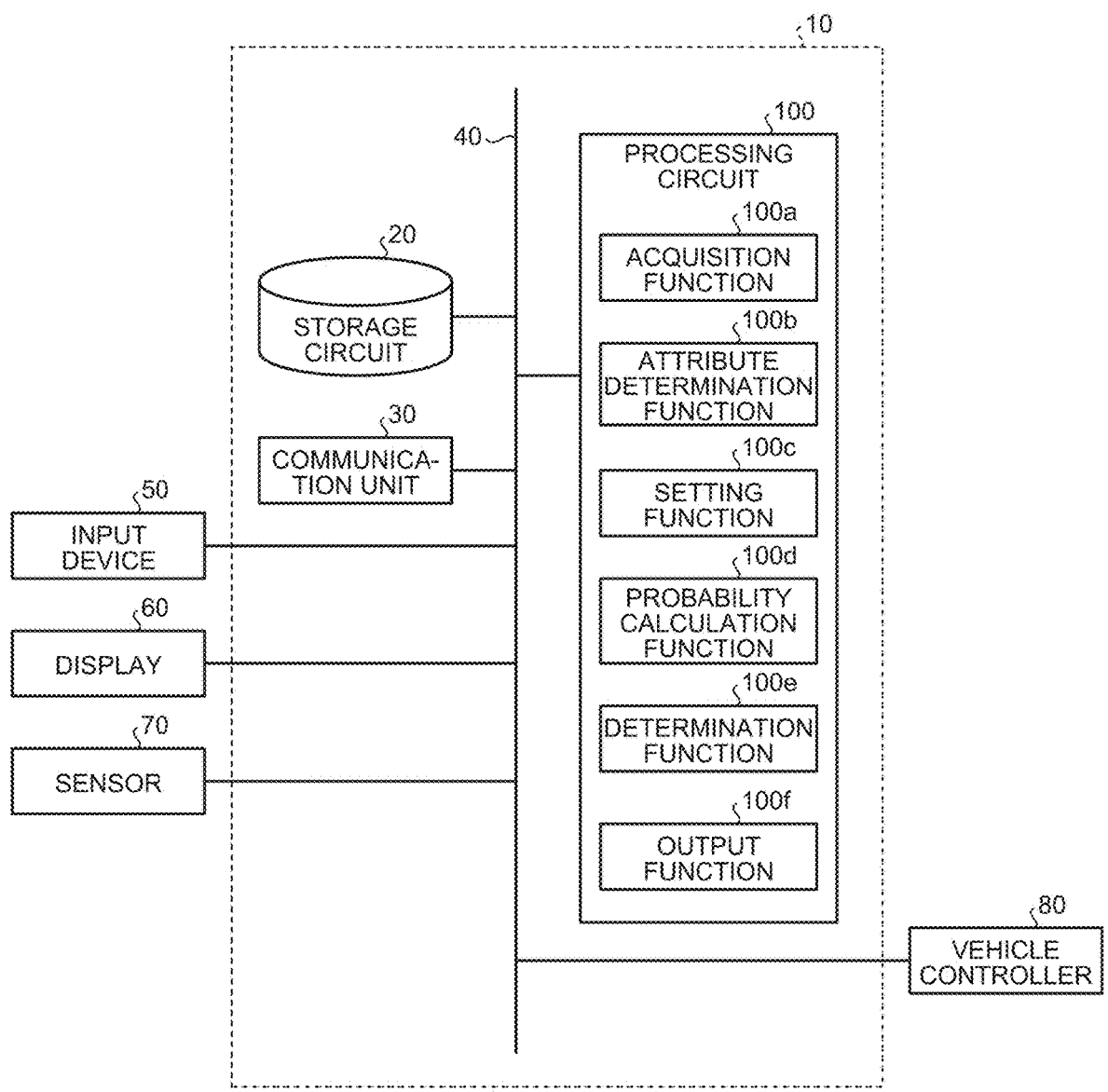
FIG. 15 is a diagram illustrating a configuration of an information processing apparatus of a fourth embodiment.

Next, a fourth embodiment will be described. Description of a portion common to that of the above-described third embodiment is appropriately omitted. FIG. 15 is a diagram illustrating an example of a configuration of an information processing apparatus 10 of the present embodiment. As illustrated in FIG. 15, a processing circuit 100 of the present embodiment is different from the above-described first embodiment in further including an output function 100f as an example of "output unit". In this example, the output function 100f outputs (displays, on a display 60), for each of a plurality of areas, an obstacle map indicating a final probability of the area. Note that the output function 100f may have a function to generate the obstacle map, or the function to generate the obstacle map may be provided separately from the output function 100f, for example. For example, the above-described determination function 100e may have the function to generate the obstacle map. As described above, the information processing apparatus 10 of the present embodiment includes a display unit that displays information regarding an existence probability of an object existing in surroundings of a moving body, which is calculated on the basis of attribute information of the surroundings of the moving body and a reliability of the attribute information. As described above, the reliability is calculated using a plurality of pieces of the attribute information for the same area. Further, in this example, the existence probability of the object is the above-described obstacle map. In this example, it may be considered that the output function 100f corresponds to the "display unit", the display 60 corresponds to the "display unit", or a combination of the output function 100f and the display 60 corresponds to the "display unit".

Fifth Embodiment

Figure 16:
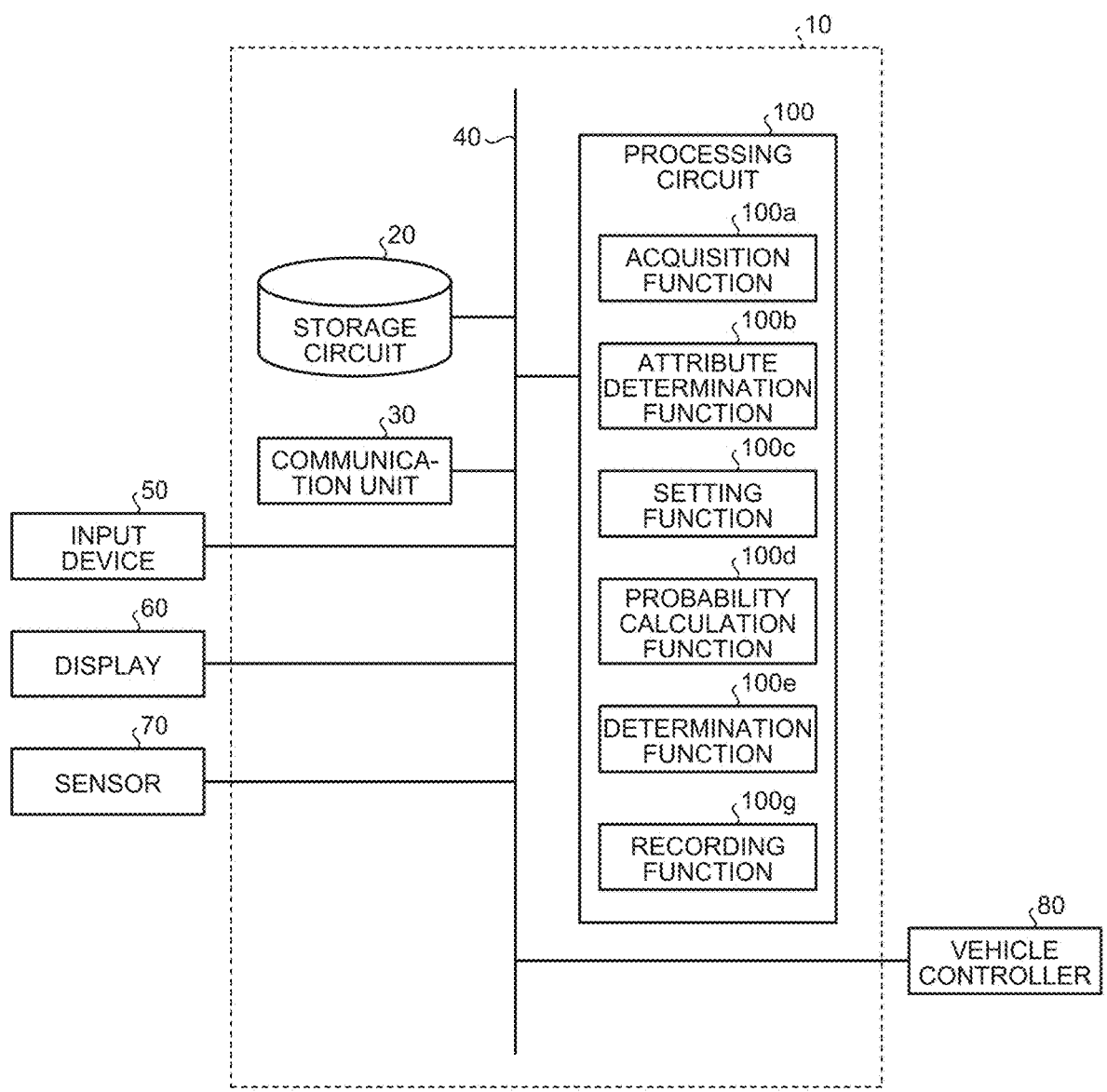
FIG. 16 is a diagram illustrating a configuration of an information processing apparatus of a fifth embodiment.

Next, a fifth embodiment will be described. Description of a portion common to that of the above-described third embodiment is appropriately omitted. FIG. 16 is a diagram illustrating an example of a configuration of an information processing apparatus 10 of the present embodiment. As illustrated in FIG. 16, a processing circuit 100 of the present embodiment is different from the first embodiment in further including a recoding function 100g as an example of "recording unit". Here, the recording function 100g records (records, in a storage circuit 20, for example), for each of a plurality of areas obtained by dividing surrounding of an own vehicle, an obstacle map indicating a final probability of the area. That is, the information processing apparatus 10 of the present embodiment further includes a storage unit (a storage circuit 20, for example) that stores the final probability (the obstacle map, in this example). Further, as described in the third embodiment, the processing circuit 100 may further include the above-described output function 100f. Further, for example, the information processing apparatus 10 may include a storage unit (the storage circuit 20, or the like, for example) that stores a travelable probability.

A vehicle controller 80 estimates a travel route avoiding an obstacle on the basis of the obstacle map recorded by the recording function 100g. As an estimation method, various known technologies can be used. The vehicle controller 80 then controls a vehicle to travel (autonomously travel) according to the estimated travel route.

Figure 17:
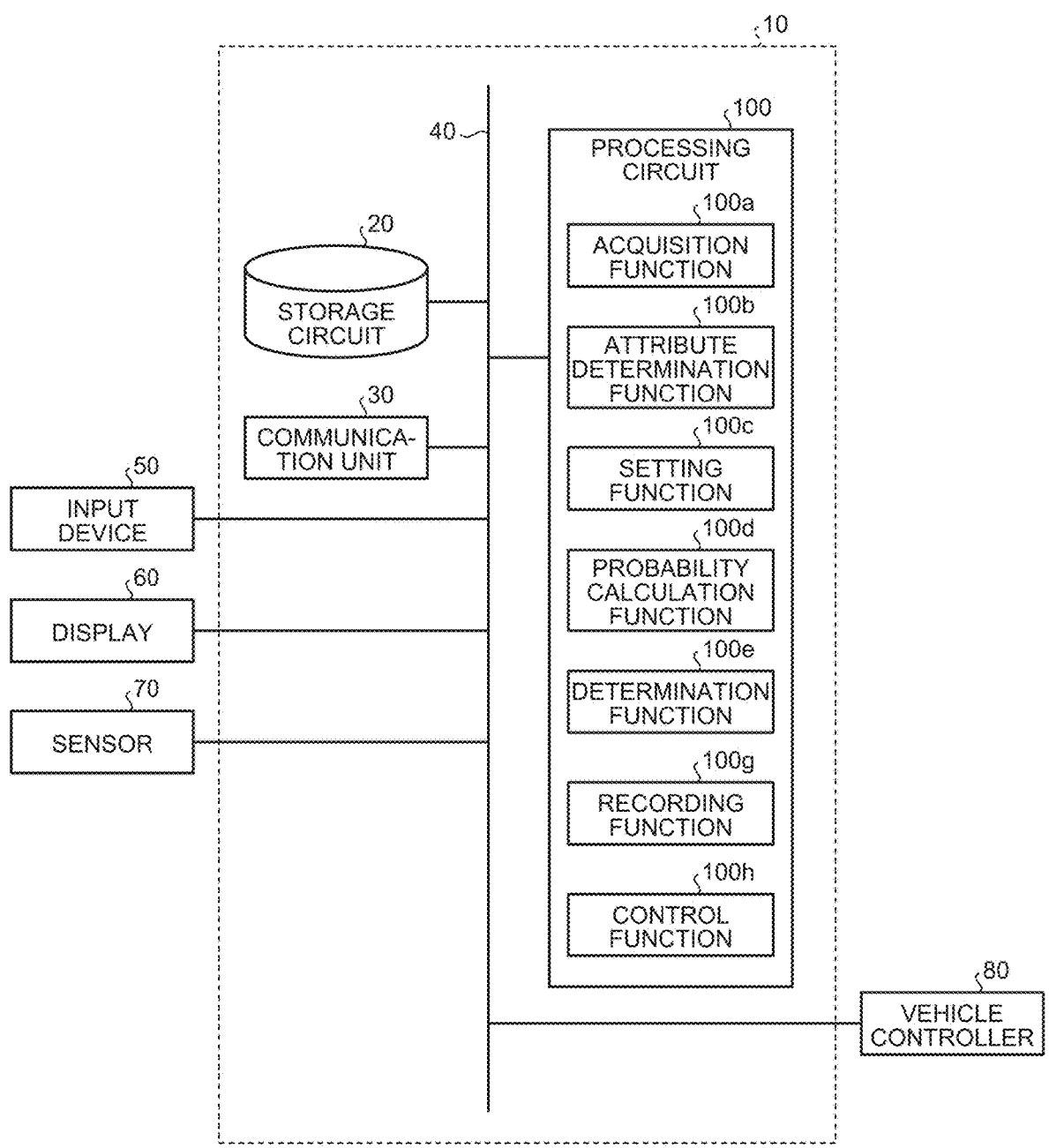
FIG. 17 is a diagram illustrating a configuration of an information processing apparatus of a modification.

For example, as illustrated in FIG. 17, the information processing apparatus 10 may further include a control function 100h. The control function 100h is an example of "controller", and calculates control information of the vehicle on the basis of the final probability. In this example, the control function 100h calculates (estimates) the travel route (an example of the control information) on the basis of the obstacle map. Note that, for example, the control function 100h may also serve the function of the vehicle controller 80, without providing the vehicle controller 80. Further, for example, when the information processing apparatus 10 includes the storage unit that stores the travelable probability, the control function 100h can calculate the control information of the vehicle on the basis of the travelable probability.

The embodiments of the present invention have been described. However, the above-described embodiments have been presented as examples, and are not intended to limit the scope of the invention. These new embodiments can be implemented in other various forms, and various omissions, replacements, and changes can be made without departing from the gist of the invention. These new embodiments and its modifications are included in the scope and the gist of the invention, and are included in the invention described in the scope of claims and its equivalents.

Further, the programs executed in the information processing apparatus 10 of the embodiments and modifications may be stored on a computer connected to a network such as the Internet, and provided by being downloaded through the network. Further, the programs executed in the information processing apparatus 10 of the embodiments and modifications may be provided or distributed through the network such as the Internet. The programs executed in the information processing apparatus 10 may be incorporated in a non-volatile recording medium such as a ROM in advance and provided.

Further, the embodiments and modifications can be arbitrarily combined.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

REFERENCE SIGNS LIST 10 information processing apparatus
20 storage circuit
30 communication unit
40 bus
50 input device
60 display
70 sensor
80 vehicle controller
100 processing circuit
100a acquisition function
100b attribute determination function
100c setting function
100d probability calculation function
100e determination function
100f output function
100g recording function
100h control function

What is claimed is:

1. An information processing apparatus, comprising:
a memory having computer executable components stored therein; and
processing circuitry communicatively coupled to the memory, the processing circuitry configured to:
acquire a plurality of pieces of observation information of surroundings of a moving body;
generate a plurality of pieces of attribute information of the surroundings of the moving body based on the plurality of pieces of observation information; and
set a reliability of each of the plurality of pieces of attribute information of the surroundings of the moving body based on attribute information included in one or more past pieces of attribute information corresponding to an area at a same position as each respective piece of attribute information, wherein
the processing circuitry is further configured to set the reliability of a piece of attribute information corresponding to a given area based on a difference between (1) a proportion of the one or more past pieces of attribute information having a same value as the piece of attribute information, and (2) a numerical value of the piece of attribute information corresponding to the given area, and
at least one of the one or more past pieces of attribute information used to set the reliability of the piece of attribute information corresponding to the given area corresponds to a different position of the moving body than a position of the moving body corresponding to the piece of attribute information for the given area.

2. The apparatus according to claim 1, wherein the processing circuitry is further configured to
acquire position information indicating an observation position, and
set, from the plurality of pieces of attribute information for the area corresponding to the same position, a reliability of the area, based on the acquired position information.

3. The apparatus according to claim 1, wherein
the plurality of pieces of observation information are each a captured image obtained through imaging, by an imager, an area surrounding the moving body.

4. The apparatus according to claim 1, wherein the plurality of pieces of observation information are information indicating a position of an object existing in the surroundings of the moving body.

5. The apparatus according to claim 1, wherein
the processing circuitry is further configured to set the reliability to a higher value as the proportion of the one or more past pieces of attribute information having the same value as the piece of attribute information is higher, and set the reliability to a lower value as the proportion of the one or more past pieces of attribute information having a same value as the piece of attribute information is lower.

6. The apparatus according to claim 1, wherein
the processing circuitry is further configured to calculate a travelable probability of the moving body based on the plurality of pieces of attribute information.

7. The apparatus according to claim 6, wherein
the processing circuitry is further configured to calculate the travelable probability of a first area where an attribute is a roadway to be a higher value than the travelable probability of a second area where the attribute is other than the roadway.

8. The apparatus according to claim 6, wherein
the processing circuitry is further configured to acquire, for each of a plurality of sensors that observes the surroundings of the moving body, probability information indicating a travelable probability of the surroundings of the moving body, and reliability information indicating the reliability of each of the plurality of pieces of attribute information of the surroundings of the moving body, and determine a final probability of the travelable probability of the surroundings of the moving body based on the acquired probability information and the acquired reliability information corresponding to each of the plurality of sensors.

9. The apparatus according to claim 8, wherein the processing circuitry is further configured to determine the travelable probability of the surroundings of the moving body corresponding to a particular sensor having a highest reliability as the final probability.

10. The apparatus according to claim 8, wherein the processing circuitry is further configured to perform a weighted summing of the travelable probabilities of each of the plurality of sensors to determine the final probability, wherein weights used in the weighted summing are determined according to the reliability information of each of the plurality of sensors.

11. The apparatus according to claim 8, wherein the memory is configured to store therein the final probability.

12. The apparatus according to claim 8, wherein the processing circuitry is further configured to calculate control information of the moving body based on the determined final probability.

13. The apparatus according to claim 6, wherein the processing circuitry is further configured to calculate control information of the moving body.

14. The apparatus according to claim 1, further comprising:
a sensor configured to measure the plurality of pieces of observation information.

15. A vehicle mounting the information processing apparatus according to claim 1.

16. The information processing apparatus of claim 1, wherein the processing circuitry is further configured to calculate the reliability of the piece of attribute information corresponding to the given area as $1-|L(t)-L'(t)|$, wherein
L(t) is the numerical value of the piece of attribute information at time t for the given area, and
L'(t) is an average value of the one or more past pieces of attribute information over a past N times for the given area, where N is an integer greater than 2.

17. An information processing apparatus, comprising:
a display configured to display information regarding an existence probability of an object existing in surroundings of a moving body, the existence probability being calculated based on each of a plurality of pieces of attribute information of the surroundings of the moving body and a reliability of each of the plurality of pieces of attribute information based on attribute information included in one or more past pieces of attribute information corresponding to an area at a same position as each respective piece of attribute information, wherein
the information processing apparatus sets the reliability of a piece of attribute information corresponding to a given area based on a difference between (1) a proportion of the one or more past pieces of attribute information having a same value as the piece of attribute information, and (2) a value of the piece of attribute information corresponding to the given area, and
at least one of the one or more past pieces of attribute information used to set the reliability of the piece of attribute information corresponding to the given area corresponds to a different position of the moving body than a position of the moving body corresponding to the piece of attribute information for the given area.

18. The apparatus according to claim 17, wherein the reliability of a piece of attribute information is calculated using a plurality of past pieces of attribute information for a same area.

19. The apparatus according to claim 17, wherein the existence probability of the object is an obstacle map.

20. An information processing method, comprising:
acquiring a plurality of pieces of observation information of surroundings of a moving body;
generating a plurality of pieces of attribute information of the surroundings of the moving body based on the plurality of pieces of observation information; and
setting a reliability of each of the plurality of pieces of attribute information of the surroundings of the moving body based on attribute information included in one or more past pieces of attribute information corresponding to an area at a same position as each respective piece of attribute information, wherein
the setting comprises setting the reliability of a piece of attribute information corresponding to a given area based on a difference between (1) a proportion of the one or more past pieces of attribute information having a same value as the piece of attribute information, and (2) a value of the piece of attribute information corresponding to the given area, and
at least one of the one or more past pieces of attribute information used to set the reliability of the piece of attribute information for information corresponding to the given area corresponds to a different position of the moving body than a position of the moving body corresponding to the piece of attribute information for the given area.

* * * * *